(12) United States Patent
Girouard et al.

(10) Patent No.: US 7,596,607 B2
(45) Date of Patent: *Sep. 29, 2009

(54) APPARATUS FOR MANAGING EMAIL MESSAGES

(75) Inventors: Janice Marie Girouard, Austin, TX (US); Emily Jane Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/163,873

(22) Filed: Jun. 27, 2008

(65) Prior Publication Data
US 2008/0256212 A1 Oct. 16, 2008

Related U.S. Application Data

(63) Continuation of application No. 10/443,677, filed on May 22, 2003, now Pat. No. 7,454,467.

(51) Int. Cl.
*G06F 15/16* (2006.01)
(52) U.S. Cl. ...................... 709/206; 709/245
(58) Field of Classification Search .................. 709/206, 709/245
See application file for complete search history.

(56) References Cited

U.S. PATENT DOCUMENTS

| | | | |
|---|---|---|---|
| 6,052,709 A | 4/2000 | Paul | |
| 6,249,805 B1 | 6/2001 | Fleming, III | |
| 6,321,267 B1 | 11/2001 | Donaldson | |
| 6,330,590 B1 | 12/2001 | Cotten | |
| 6,421,709 B1 | 7/2002 | McCormick et al. | |
| 6,453,327 B1 | 9/2002 | Nielsen | |
| 7,096,498 B2 | 8/2006 | Judge | |
| 7,149,801 B2 | 12/2006 | Burrows et al. | |
| 7,213,260 B2 | 5/2007 | Judge | |
| 7,225,466 B2 | 5/2007 | Judge | |
| 7,249,175 B1 | 7/2007 | Donaldson | |
| 7,320,020 B2 | 1/2008 | Chadwick et al. | |
| 7,454,467 B2 * | 11/2008 | Girouard et al. | 709/206 |
| 7,472,163 B1 * | 12/2008 | Ben-Yoseph et al. | 709/206 |
| 7,487,262 B2 * | 2/2009 | Cardina et al. | 709/246 |
| 2002/0078371 A1 | 6/2002 | Heilig et al. | |
| 2003/0172167 A1 | 9/2003 | Judge et al. | |
| 2003/0172291 A1 | 9/2003 | Judge et al. | |
| 2003/0172292 A1 | 9/2003 | Judge | |
| 2003/0172294 A1 | 9/2003 | Judge | |
| 2004/0083388 A1 | 4/2004 | Nguyen | |
| 2004/0210640 A1 | 10/2004 | Chadwick et al. | |

* cited by examiner

*Primary Examiner*—Douglas B Blair
(74) *Attorney, Agent, or Firm*—Yee & Associates, P.C.; Matthew W. Baca

(57) ABSTRACT

A method, apparatus, and computer instructions for managing email messages. Outgoing packets are monitored. The outgoing packets are parsed for outgoing email messages. An identification of recipients in packets for outgoing email messages is made. A list of email addresses is updated with email addresses for the identified recipients, wherein the list of email addresses is used to accept incoming email messages. The outgoing packets also are parsed to identify Web traffic containing a user email address. A domain name of the destination is identified for Web traffic containing the user email address. The list of email messages is updated with this domain name. Incoming email messages are screened to see if the domain name is present in the email address of the sender in determining whether to accepted the email messages.

11 Claims, 4 Drawing Sheets

APPARATUS FOR MANAGING EMAIL MESSAGES

BACKGROUND OF THE INVENTION

1. Technical Field

The present invention relates generally to an improved data processing system and in particular to a method and apparatus for managing data in a data processing system. Still more particularly, the present invention relates to a method, apparatus, and computer instructions for managing email messages.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

A widespread use of the Web is in the area of communications. Electronic messages, also referred to as "email" messages, are a widespread form of communication that has quickly overtaken the "written" letter. As with physical mail, users often receive junk mail or "spam", which has been sent unsolicited. With spam, a user has a choice of different mechanisms to deal with the unsolicited email. A user may manually delete the unwanted messages.

Alternatively, the user may use a filter to block email messages from unwanted sources. These filters require the user to add email addresses to a list that is used to filter out unwanted messages. The drawback of this type system is that a user is required to maintain the list. System level filtering is available from Internet service providers (ISPs). These providers generate black lists of know sources of spam, and block the delivery of email messages from those sources. One problem with system level filtering is that it is sometimes hard to distinguish between legitimate commercial email messages and spam. These systems block all email messages, including legitimate ones in additions to the spam.

Therefore, it would be advantageous to have an improved method, apparatus, and computer instructions for managing unsolicited email messages.

SUMMARY OF THE INVENTION

The present invention provides a method, apparatus, and computer instructions for managing email messages. Outgoing packets are monitored. The outgoing packets are parsed for outgoing email messages. An identification of recipients in packets for outgoing email messages is made. A list of email addresses is updated with email addresses for the identified recipients, wherein the list of email addresses is used to accept incoming email messages. The outgoing packets also are parsed to identify Web traffic containing a user email address. A domain name of the destination is identified for Web traffic containing the user email address. The list of email messages is updated with this domain name. Incoming email messages are screened to see if the domain name is present in the email address of the sender in determining whether to accepted the email messages.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
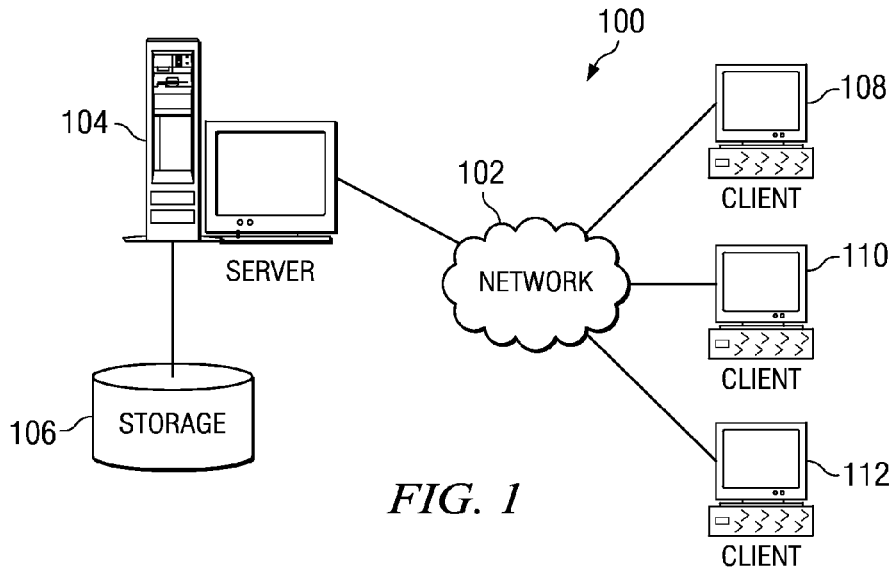
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In this example, storage unit 106 is connected to server 102. In addition, clients 108, 110, and 112 are connected to network 102. These clients 108, 110, and 112 may be, for example, personal computers or network computers. In the depicted example, server 104 may provide data, such as boot files, operating system images, and applications to clients 108-112. Clients 108, 110, and 112 are clients to server 104. Server 104 may act as an Internet service provider and/or email message provider to the clients in these examples.

Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
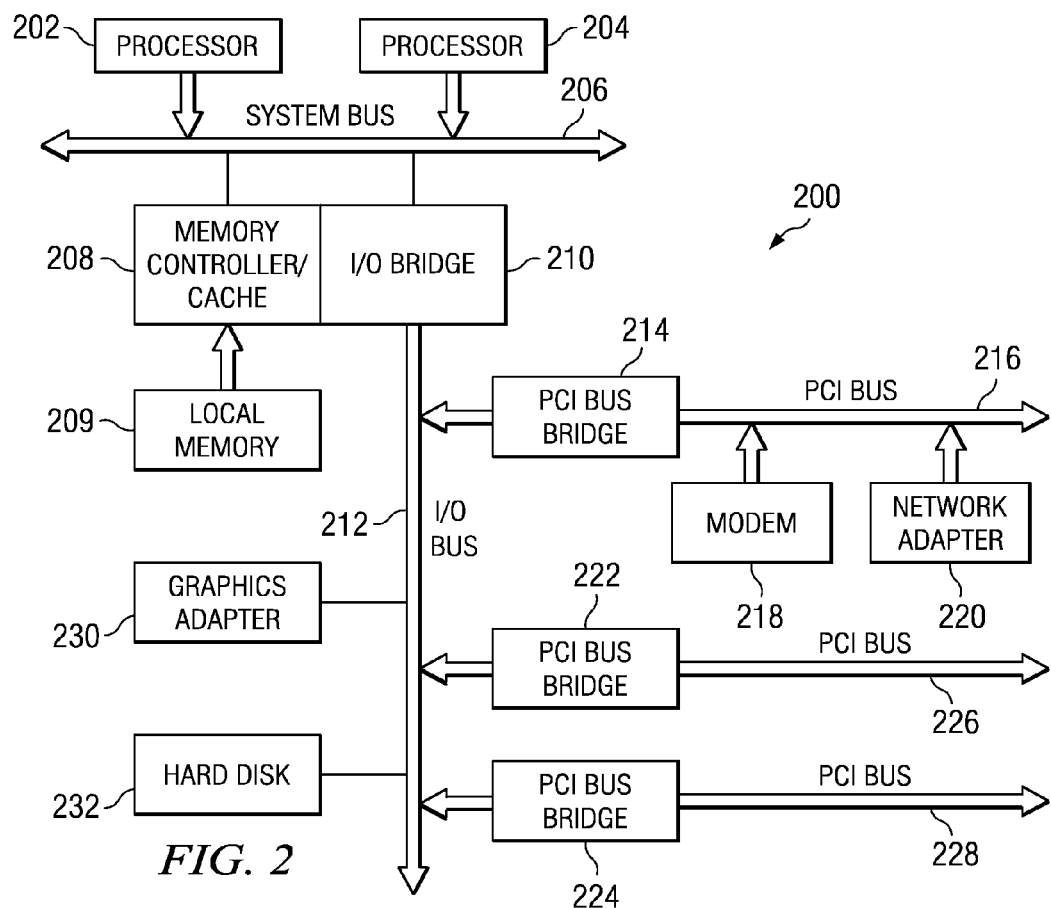
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
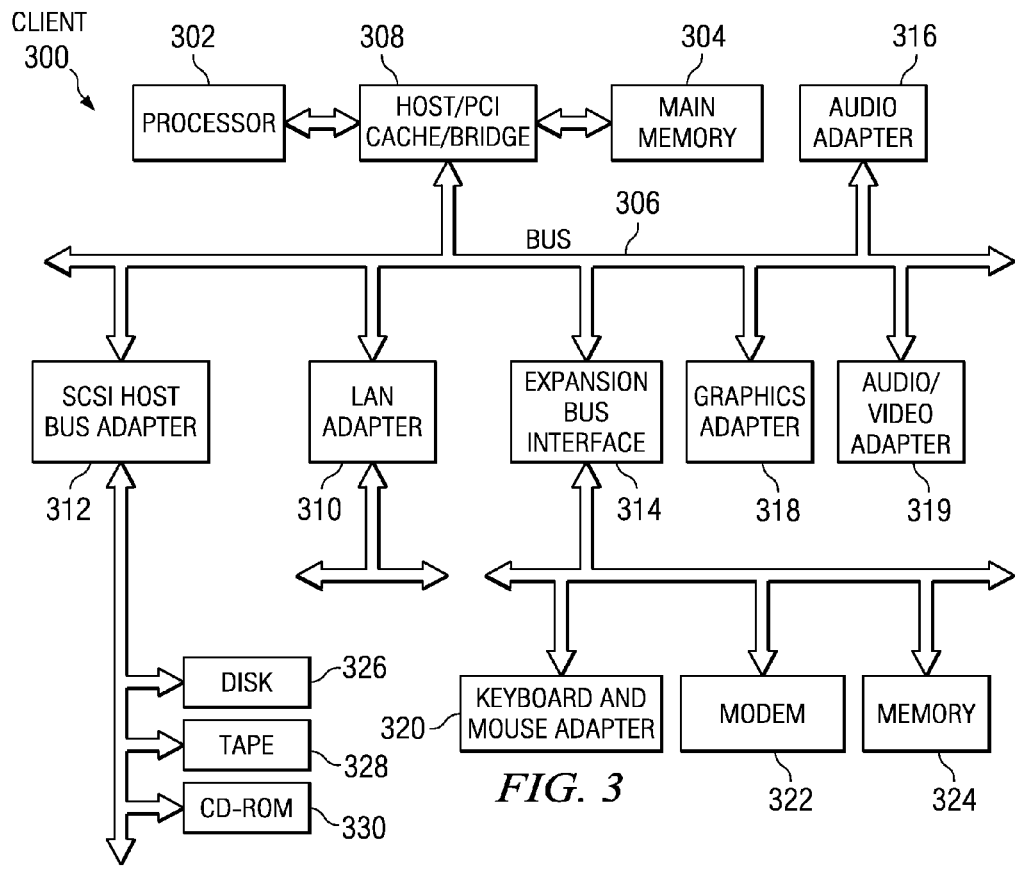
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. Instructions for the operating system and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for managing email messages. The mechanism of the present invention provides for automatic maintenance of filters used in filtering out unsolicited email messages. Outgoing connections are monitored for email traffic and web traffic. Email traffic is monitored to identify recipients of email generated by the user. The email addresses of these recipients are added to a list of addresses also referred to as a white list.

Additionally, Web traffic is also monitored for the user's email address within documents being sent to Web servers. An email address for the Web server is identified when the user's email address is found in a document, such as a registration form being sent to the Web server, the domain name, such as "ibm.com", for the Web server also is added to the white list. The domain name for the Web server is also referred to as a source domain name.

This white list is then used to determine which incoming email is to be forwarded to the user and to determine which ones are to be discarded or placed into a folder for review. This folder may be, for example, a junk folder, or a deleted folder.

Figure 4:
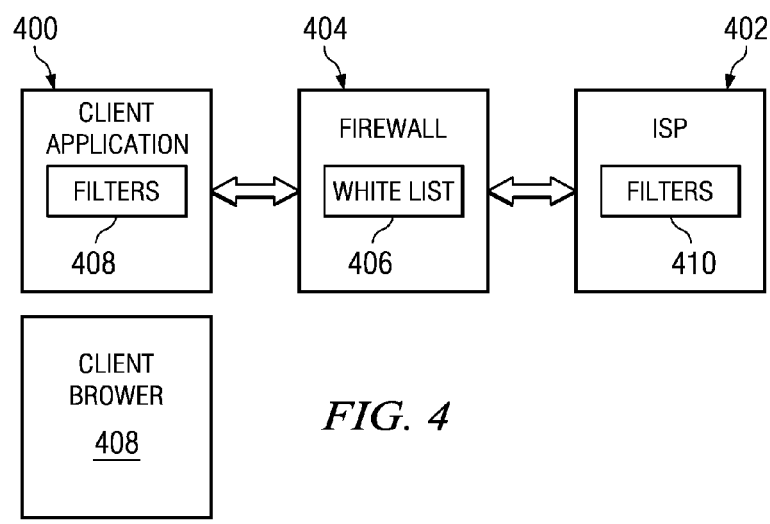
FIG. 4 is a diagram of components used in managing email in accordance with a preferred embodiment of the present invention.

Turning now to FIG. 4, a diagram of components used in managing email is depicted in accordance with a preferred embodiment of the present invention. In this example, client application 400 is an email program and may receive or send email from ISP 402. ISP 402 may contain email services used by client application 400 or may merely serve as an interface to the Internet.

In this example, firewall 404 is implemented to manage email received by client application 400. White list 406 is used to determine email messages that are to be received by client application 400 from ISP 402. White list 406 is a list of email addresses from sources that may be forwarded onto client application 400. When firewall 404 receives email messages destined for client application 400, the sender or "from" address is checked to determine whether the email address or the domain name in the sender's email address is found on white list 406. If the email address for the sender is present on white list 406, the email message is then sent on to client application 400. Otherwise, the email message is discarded or placed in some other folder for review. This other folder may be a junk mail or spam folder that is emptied on some periodic basis without requiring user intervention.

Firewall 404 monitors all outgoing traffic from a client computer. For example, all email traffic sent out by client application 400 is monitored by firewall 404. In addition, outgoing traffic from client browser 408 also is monitored from firewall 404. Specifically, firewall 404 monitors outgoing packets from the client computer.

With respect to outgoing email generated by client application 400, firewall 404 looks for connections to email servers. For example, firewall 404 looks for connections to servers using a simple mail transfer protocol (SMTP), post office protocol (POP), and Internet message access protocol (IMAP). STMP uses port 25, POP uses port 10, and IMAP uses port 143. When outgoing traffic, such as traffic to these ports, is detected, firewall 404 parses the outgoing data stream for this traffic, looking for outgoing mail. Email addresses for recipients, such as those in "TO:", "CC:", and "BCC:" are identified. These recipients are added to white list 406.

Additionally, firewall 404 monitors outgoing traffic generated by client browser 408. Connections, such as those to Web servers are identified. For example, a connection to port 80 causes firewall 404 to parse the outgoing data stream looking for instances of the user's email address. The user's email address may be found in forms filled in by user, such as POST or GET based forms. When such instances of the user's email address are found in the outgoing traffic, the domain of the Web server receiving the information is added to the list of email domains. Additionally, the user also may directly edit white list 406 to add or remove email addresses or domain names.

In these examples, firewall 404 implements the processes of the present invention. Firewall 404 may be implemented in various places depending on the particular implementation. For example, firewall 404 may be on the same client computer as the application 400 and client browser 408. Alternatively, firewall 404 may be located on computers for ISP 402 or on some data processing system. The process of the present invention could also be implemented within client application 400 to monitor outgoing traffic from the client computer. In such a case, a white list may be implemented within filters 408 in client applications 400. If the mechanism of the present invention is located at ISP 402, then a white list may be implemented within filters 410.

Figure 5:
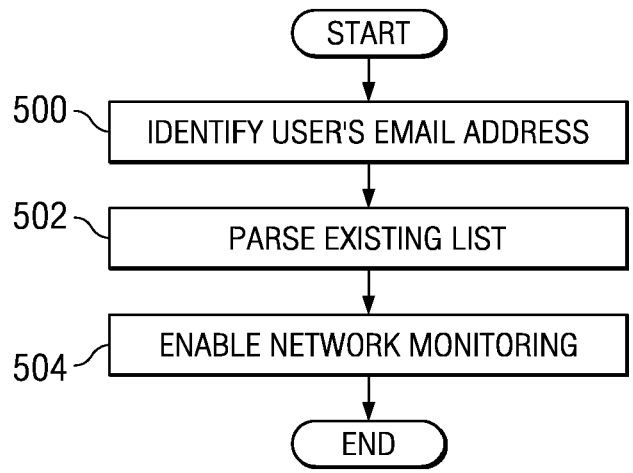
FIG. 5 is a flowchart of a process for initializing an email management mechanism in accordance with a preferred embodiment of the present invention.

Turning now to FIG. 5, a flowchart of a process for initializing an email management mechanism is depicted in accordance with a preferred embodiment of the present invention. The process illustrated in FIG. 5 may be implemented in a firewall, such as firewall 404, in FIG. 4.

The process begins by identifying the user's email address (step 500). This address may be retrieved from a configuration file. Alternatively, a user may be prompted to enter the current email address. An existing white list is parsed for use in filtering email messages (step 502). As described above, this list includes email addresses and domain names. Thereafter, network monitoring is enabled (step 504), with the process terminating thereafter.

Figure 6:
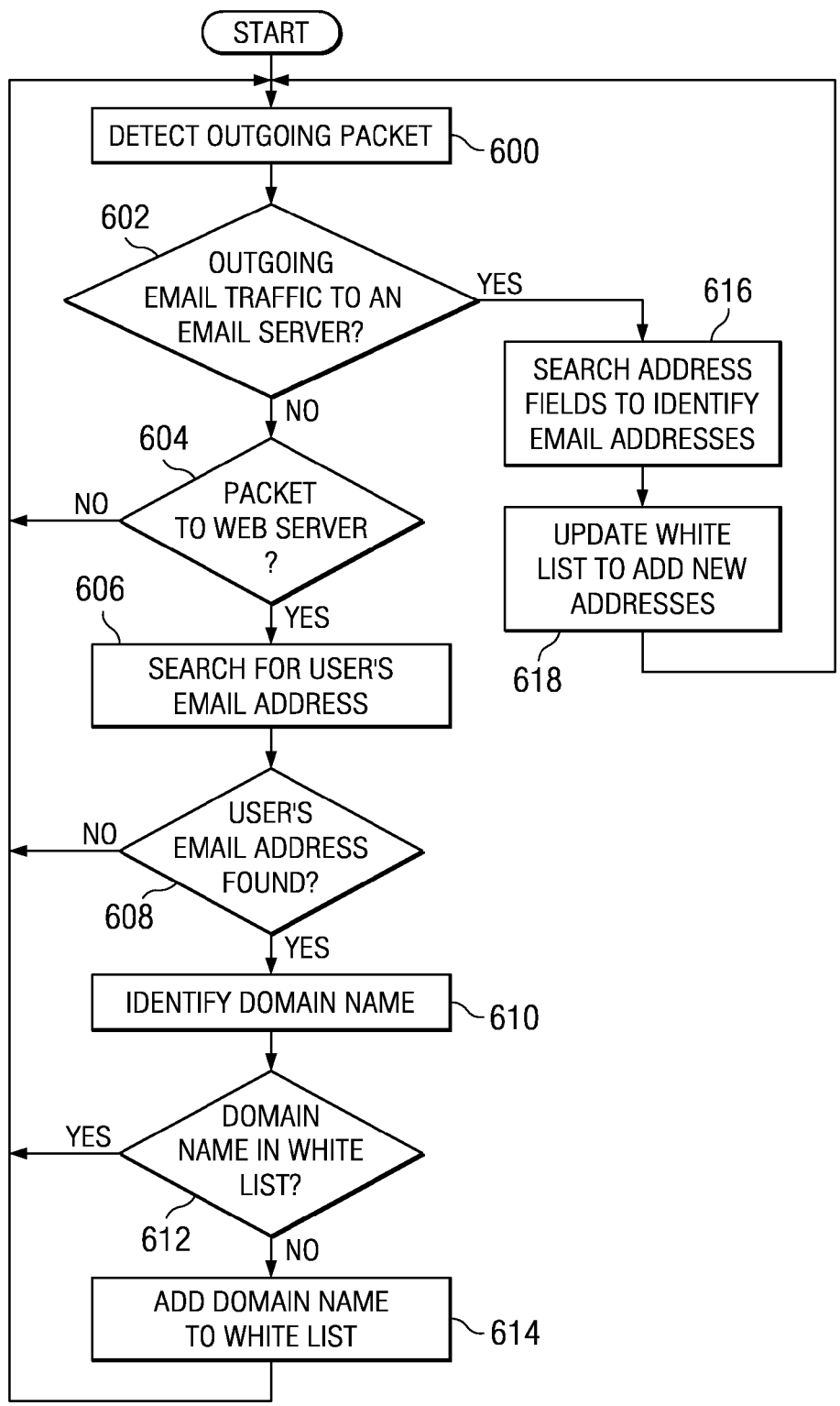
FIG. 6 is a flowchart of a process used for managing a list of email addresses and domain names in accordance with a preferred embodiment of the present invention.

Turning now to FIG. 6, a flowchart of a process used for managing a list of email addresses and domain names is depicted in accordance with a preferred embodiment of the present invention. The process illustrated in FIG. 6 may be implemented in a firewall, such as firewall 404 in FIG. 4.

The process begins by detecting an outgoing packet (step 600). A determination is made as to whether the outgoing packet is outgoing email traffic to an email server (step 602). In these examples, the process looks for connections to email servers. If the outgoing packet is not directed to an email server, a determination is made as to whether the outgoing packet is directed to a Web server (step 604). Step 604 involves determining whether a connection to a Web server has been made, such as a connection to port 80.

In these examples, the outgoing traffic is shown only with respect to email servers and web servers. The mechanism of the present invention may be applied to all outgoing traffic. Other types of traffic may be identified depending on the connection type being made. Alternatively, all outgoing packets may be monitored for information, such as the user's email address.

If the outgoing packet is to a Web server, a search is made for a user's email address (step 606). A determination is then made as to whether the user's email address is found in the packet (step 608). If the user's email address is present in the packet, a domain name is identified for the web server (step 610). Then, a determination is made as to whether the domain name is present in the white list (step 612). If the domain name is not present in the white list, the domain name is added to the white list (step 614), with the process returning to step 600 as described above.

With reference again to step 612, if the domain name is present in the white list, the step also returns to step 600. Similarly, the process returns to step 600 if the user's email address is not found in step 608. With reference again to step 604, if the packet is not directed to a Web server, the process also returns to step 600.

With reference back to step 602, if the outgoing packet is part of an email to an email server, address fields are searched to identify email addresses for recipients (step 616). The white list is updated to add any new email addresses (step 618), with the process returning to step 600 as described above.

Figure 7:
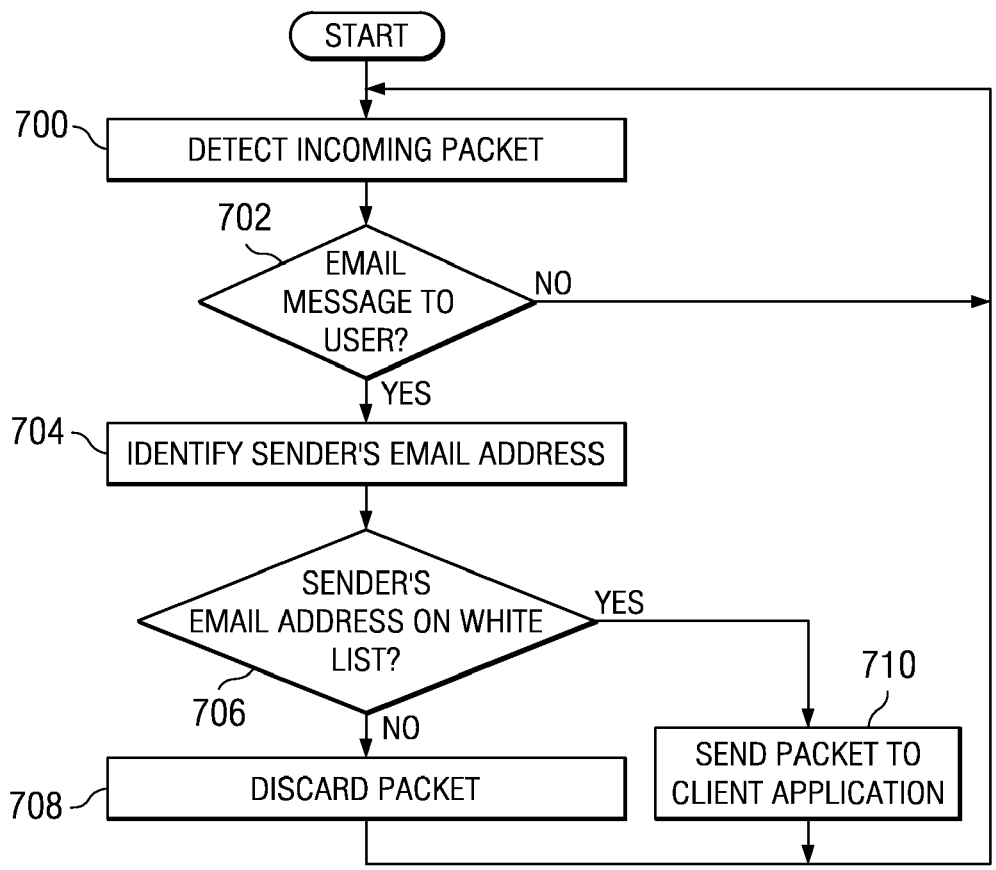
FIG. 7 is a flowchart of a process for filtering email using a white list in accordance with a preferred embodiment of the present invention.

Turning to FIG. 7, a flowchart of a process for filtering email using a white list is depicted in accordance with a preferred embodiment of the present invention. The process illustrated in FIG. 7 may be implemented in a firewall, such as firewall 404 in FIG. 4.

The process begins by detecting an incoming packet (step 700). Thereafter, a determination is made as to whether the incoming packet is part of an email message to the user (step 702). If the packet is for an email message to the user, then the sender's email address is identified. A determination is made as to whether the sender's email address is on the white list (step 706). If the sender's email address is not on the white list, the packet is discarded (step 708), with the process then returning to step 700 as described above.

With reference again to step 706, if the sender's email address is on the white list, the packet is then sent to the client application (step 710), with the process then returning to step 700 as described above. Turning back to step 702, if the incoming packet is not for an email message for the user, the process returns to step 700.

Thus, the present invention provides a method, apparatus, and computer instructions for managing email traffic. The mechanism of the present invention monitors outgoing packets and parses the data stream for outgoing email messages. When outgoing email messages are found, the recipients of the messages are used to update a white list. In other words, if the email address for the recipient is not found in the white list, the address is then added to the white list. If the email address already is found in the white list, no change is made in updating the white list. Further, other traffic, such as Web traffic, is monitored for the user's email address. If the user's email address is found, the domain name of the server to which the packet is being sent is added to the white list. Thus, the user is not required to actively edit a list of addresses from which the user will accept email messages. Of course, the user may also manually edit this list to add or remove email addresses and domain names from the list.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for managing email messages, the data processing system comprising:
   a bus system;
   a memory connected to the bus system, wherein the memory includes computer usable program code; and
   a processing unit connected to the bus system, wherein the processing unit executes the computer useable program code to monitor outgoing packets initiated by a user of the data processing system, the computer usable code including code to:
   parse the outgoing packets for outgoing email messages and non-email Web traffic;
   identify recipients in packets for the outgoing email messages to form identified recipients;
   determine whether a user email address of the user is present in the non-email Web traffic;
   responsive to the user email address being present in the non-email Web traffic, identify a domain name of a destination for the non-email Web traffic in which the user email address is present; and
   update a list of email addresses with email addresses for the identified recipients, wherein the list of email addresses is used to categorically accept incoming email messages from the identified recipients and the domain name.

2. The data processing system of claim 1, wherein a given incoming email message is categorically accepted if the domain name is present in an email address of the given incoming email message.

3. The data processing system of claim 2, wherein the computer useable program code further comprises computer useable program code to monitor incoming packets, and wherein the computer useable program code to monitor incoming packets further comprises:
   computer usable program code to parse the incoming packets for email messages; and
   computer usable program code to discard incoming packets for email messages in which a sender address or domain name is absent from the list of email addresses.

4. The data processing system of claim 1, wherein the computer usable program code to monitor, parse, identify, and update are implemented in a firewall.

5. The data processing system of claim 1, wherein the data processing system is at an internet service provider.

6. The data processing system of claim 1, wherein the computer usable program code to monitor, parse, identify, and update are implemented in a client email application.

7. The data processing system of claim 1, wherein the outgoing packets are parsed to identify whether selected destination ports are present (i) to determine whether the outgoing packets are for the outgoing email messages and (ii) to determine whether the outgoing packets are for the non-email Web traffic.

8. The data processing system of claim 1, wherein the list of email addresses is updated using user entered email addresses.

9. A computer program product tangibly embodied in a tangible computer recordable-type media and operable with a data processing system for managing email messages, the computer program product comprising:
- first instructions for monitoring outgoing packets initiated by a user of the data processing system;
- second instructions for parsing the outgoing packets for outgoing email messages and non-email Web traffic;
- third instructions for identifying recipients in packets for the outgoing email messages to form identified recipients; and
- fourth instructions for determining whether a user email address of the user is present in the non-email Web traffic;
- fifth instructions, responsive to the user email address being present in the non-email Web traffic, for identifying a domain name of a destination for the non-email Web traffic in which the user email address is present;
- sixth instructions for updating a list of email addresses with email addresses for the identified recipients, wherein the list of email addresses is used to categorically accept incoming email messages from the identified recipients and the domain name.

10. The computer program product of claim 9 wherein a given incoming email message is categorically accepted if the domain name is present in an email address of the given incoming email message.

11. A computer program product tangibly embodied in a computer recordable-type medium operable with a data processing system for managing email messages, the computer program product comprising:
- first instructions for parsing packets for outgoing email messages and non-email Web traffic initiated by a user of the data processing system;
- second instructions for identifying recipients in the packets for outgoing email messages to form identified recipients;
- third instructions for determining whether a user email address of the user is present in the non-email Web traffic;
- fourth instructions, responsive to the user email address being present in the non-email Web traffic, for identifying a domain name of a destination for the non-email Web traffic in which the user email address is present;
- fifth instructions for third instructions for updating a list of email addresses with email addresses for the identified recipients and the domain name of the destination; and
- sixth instructions for accepting incoming email messages if the sender of an email message is a previously identified recipient in the list of email addresses and accepting an incoming email message if the incoming email message is from a previously identified domain name in the list of email addresses.

* * * * *